April 7, 1970  J. G. ATTWOOD  3,505,136
METHOD AND APPARATUS FOR BONDING THERMOPLASTIC SHEET MATERIALS
Filed Sept. 19, 1966  6 Sheets-Sheet 2

April 7, 1970   J. G. ATTWOOD   3,505,136
METHOD AND APPARATUS FOR BONDING THERMOPLASTIC SHEET MATERIALS
Filed Sept. 19, 1966   6 Sheets-Sheet 3

April 7, 1970 J. G. ATTWOOD 3,505,136
METHOD AND APPARATUS FOR BONDING THERMOPLASTIC SHEET MATERIALS
Filed Sept. 19, 1966 6 Sheets-Sheet 5

United States Patent Office 3,505,136
Patented Apr. 7, 1970

3,505,136
METHOD AND APPARATUS FOR BONDING THERMOPLASTIC SHEET MATERIALS
John G. Attwood, Oak Park, Ill., assignor to Union Special Machine Company, Chicago, Ill., a corporation of Illinois
Filed Sept. 19, 1966, Ser. No. 580,529
Int. Cl. B32b 31/16, 31/22; B29c 27/08
U.S. Cl. 156—73                                      20 Claims

ABSTRACT OF THE DISCLOSURE

A method and apparatus for ultrasonically bonding thermoplastic material in which a pair of dielectric or heat-insulating members are movably positioned on opposite sides of the material and are advanced through the bonding apparatus at a rate of movement which is less than that of the material. In some embodiments the material is cleaned either during or immediately prior to the bonding operation.

---

This invention relates to a method and apparatus for bonding pieces of material and more particularly to a method and apparatus for bonding pieces of thermoplastic sheet material.

There has been developed an ultrasonic sealing system for joining pieces of material which is extremely rapid in action and highly efficient. Representative methods and apparatus in accordance with this system are disclosed, for example, in copending U.S. application Ser. No. 425,231, now Patent 3,405,024; 425,133, now Patent 3,350,582; and 425,230, now Patent 3,447,051; each filed on Jan. 13, 1965, by John G. Attwood and Robert L. Kosrow. The system includes a vibratory sealing tool having a jaw member or horn which is vibrated at its natural mechanical resonant frequency through the use of a crystal or other transducer. The pieces of material to be joined are inserted between the vibrating jaw and a stationary jaw to provide a uniform and continuous seal.

Vibratory sealing tools including those of the foregoing type are particularly well suited for joining pieces of thermoplastic sheet material. In addition, a variety of heat sealing processes have been employed to form the desired seals in such materials. In some cases, the resulting seals have been in the form of a narrow bead which runs along the seam, while in other situations the sealing process forms a depression along one or both of the pieces of material being joined. Of particular advantage is the so-called "bulge" seal, in which the cross section of the seam exhibits a bulging appearance such that the seam is considerably thicker than the combined thicknesses of the layers of material.

Heretofore, methods and apparatus for joining pieces of thermoplastic sheet material have exhibited several disadvantages. For example, difficulties have been encountered in readily adapting such prior methods and apparatus to the formation of a bulge type seal. In addition, to enable the realization of a seal of maximum strength the facing surfaces of the pieces of material to be joined should be completely clean and free from contamination by foreign substances, and many of the methods and apparatus previously employed have proved deficient in this respect. Furthermore, it has been difficult heretofore to provide the desired seals on a rapid and continuous basis, and these latter difficulties have been of special moment in the sealing of filled thermoplastic bags or other oddly shaped articles.

One general object of this invention therefore is to provide a method and apparauts for bonding pieces of thermoplastic sheet material through the use of a vibratory sealing tool.

More specifically, it is an object of this invention to provide such method and apparatus which enable the formation of a high strength bulge type seal.

Another object of this invention is to provide a method and apparatus for joining pieces of material and for insuring that the facing surfaces of the material are completely clean and free from foreign substances.

A further object of the invention is to provide a process for interconnecting pieces of material in which the interconnection is formed on a continuous basis and at high speed.

Still another object of the invention is to provide new and improved apparatus for joining pieces of material which is economical to manufacture and thoroughly reliable in operation.

In one illustrative embodiment of the invention, the pieces of material to be joined are continuosly advanced along a feed path in superimposed facing relationship with each other by conveyor means of unique construction and arrangement. As the pieces of material move along their path, they are positioned between a pair of movable dielectric members which pass between the jaws of a vibratory sealing tool. One of the jaws of the tool is vibrated at a predetermined ultrasonic frequency to transmit vibratory energy through the dielectric members to the pieces of material and thereby form a smooth and uniform bond therebetween.

In accordance with one feature of the invention, in several particularly advantageous embodiments, the dielectric members are directed along the feed path at a rate which is substantially less than the rate of movement of the pieces of material. These members, which illustratively comprise narrow strips of a suitable polymeric material, are arranged to insure the formation of a bulge type seal which exhibits high strength and extremely good moisture impervious characteristics. Because of the relatively slow speed of the dielectric members, there is no substantial heat loss from the pieces being joined, while the speed is sufficient to continuously replenish the dielectric material between the jaws.

In accordance with another feature of the invention, in certain preferred arrangements, a wetting fluid is applied to the facing surfaces of the pieces of material to be joined, and the surfaces are then thoroughly cleaned by the application of vibratory energy thereto. The arrangement is such that any contamination of the seal is positively prevented at all times.

In accordance with a further feature of certain embodiments of the invention, unique guide means is employed for spreading the facing surfaces of the pieces of material in order to apply the wetting fluid therebetween. The guide means advantageously is arranged to form a pocket for the fluid which runs along the length of the seam, thereby insuring that the surfaces are thoroughly coated with fluid at the time the vibratory energy is applied.

3

The present invention, as well as further objects and features thereof, will be understood more clearly and fully from the following description of certain preferred embodiments, when read with reference to the accompanying drawings, in which.

Figure 1:
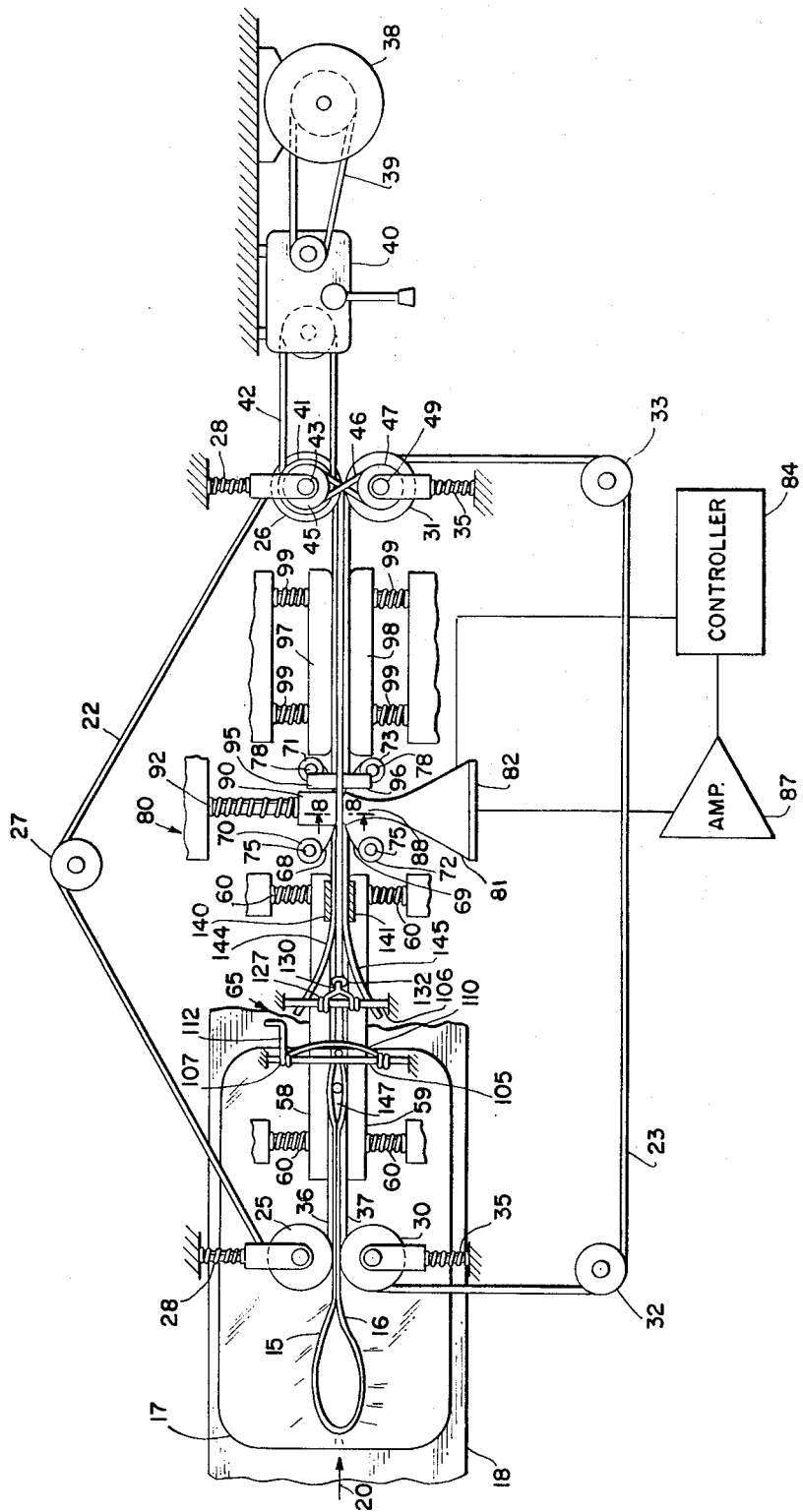
FIGURE 1 is a partly schematic top elevational view of apparatus for ultrasonically cleaning and bonding together the open upper ends of filled polymeric bags in accordance with one illustrative embodiment of the invention.
Figure 2:
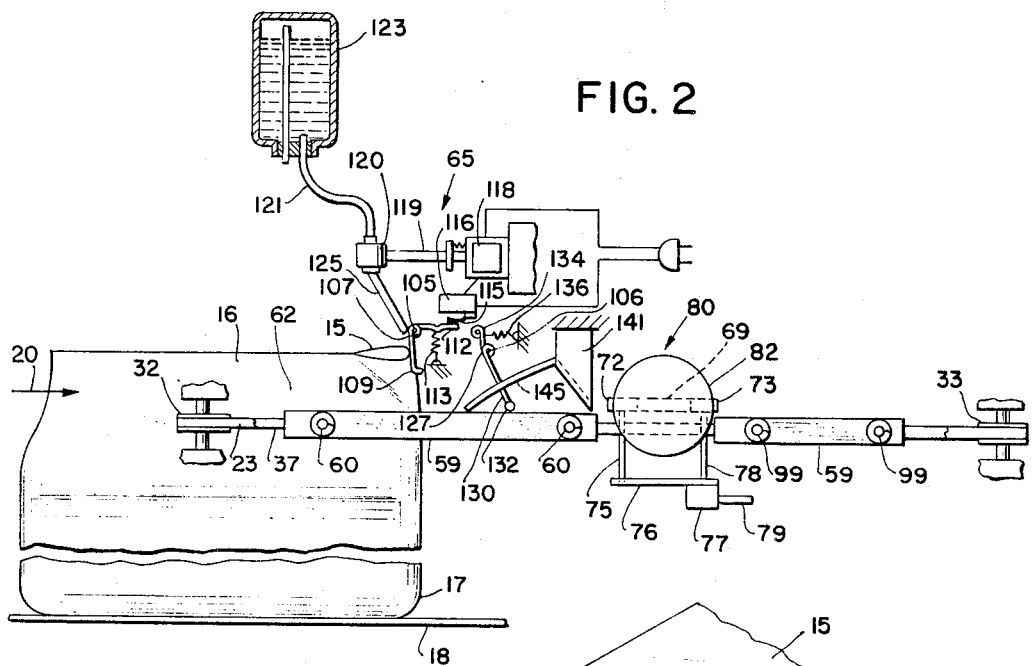
FIGURE 2 is a partly schematic side elevational view of the apparatus shown in FIGURE 1.
Figure 3:
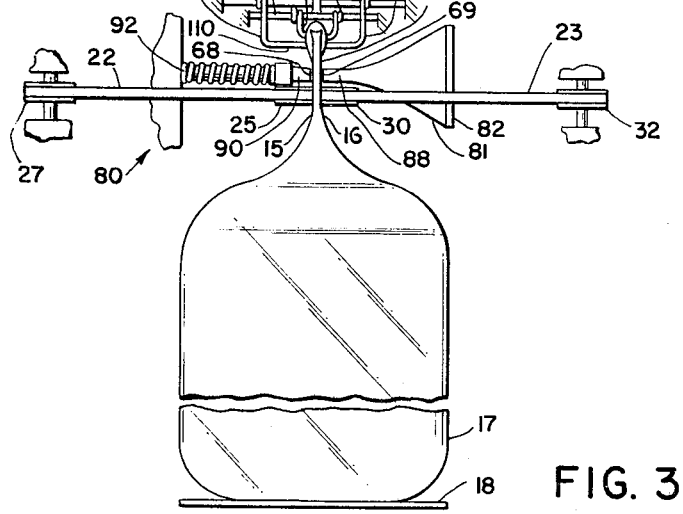
FIGURE 3 is a partly schematic end elevational view of the apparatus as seen from the left in FIGURES 1 and 2, with certain parts omitted for purposes of clarity.

Referring to FIGURES 1–3 of the drawings, there is shown an apparatus for ultrasonically cleaning and sealing two pieces 15 and 16 of thermoplastic sheet material. The pieces 15 and 16 illustratively comprise the open upper ends of a filled polyethylene bag 17 which is supported on a conveyor belt 18. The pieces 15 and 16 are continuously advanced along a substantially straight path indicated generally at 20 by two conveyor belts 22 and 23. These latter belts are disposed above the bag conveyor 18 and engage the outer surfaces of the pieces 15 and 16 a short distance beneath the upper edge of the bag to hold the pieces in superimposed contacting relationship with each other.

The conveyor belt 22 is disposed on one side of the feed path 20 and is supported by three pulleys 25, 26 and 27. The pulleys 25 and 26 are arranged along the feed path and are resiliently supported by springs 28, while the pulley 27 comprises an idler pulley which is spaced from the path intermediate the pulleys 25 and 26. The conveyor belt 23 is located on the opposite side of the feed path and extends around four pulleys 30, 31, 32 and 33. The pulleys 30 and 31 are positioned opposite the pulleys 25 and 26 and are similarly supported by means of springs 35. The pulleys 32 and 33 serve as idler pulleys and are spaced from the feed path. With this arrangement, the inner portions or reaches 36 and 37 of the respective belts 22 and 23 extend in parallel directions on opposite sides of the pieces 15 and 16 of material to be joined. The springs 28 and 35 on the pulleys 25, 26, 30 and 31 urge the reaches 36 and 37 together under pressure to firmly grip the pieces of material therebetween.

4

An electric drive motor 38 is fixedly supported adjacent the outfeed end of the feed path 20 (the right end as viewed in FIGURE 1). The motor 38 is connected through a drive belt 39 to a speed reducing mechanism 40 which rotates a pulley 41 by means of a belt 42. The pulley 41 is keyed or otherwise affixed to a shaft 43 for the conveyor belt pulley 26. Also affixed to the shaft 43 is a transmission pulley 45 which cooperates with a cross belt 46 to drive a second transmission pulley 47 at the same speed but in the opposite direction. The pulley 47 is carried by a shaft 49 for the conveyor belt pulley 31. Upon energization of the motor 38, the conveyor belts 22 and 23 are driven continuously at a constant speed to advance their respective inner reaches 36 and 37 along the feed path 20.

Positioned in facing relationship with the outer surfaces of the belt reaches 36 and 37 are two presser plates 58 and 59. The plates 58 and 59 are biased toward each other by coil springs 60 and extend longitudinally along the feed path 20 for an appreciable distance from adjacent the infeed pulleys 25 and 30. The plates urge the reaches 36 and 37 together under pressure to squeeze the pieces 15 and 16 of material to be joined therebetween. As the pieces 15 and 16 move between the plates, cleaning fluid is applied to their inner facing surfaces at a cleaning station 65 in a manner that will become more fully apparent hereinafter.

Two insulating members in the form of tapes 68 and 69 are movably disposed on opposite sides of the feed path 20 immediately downstream of the cleaning station 65. The tapes 68 and 69 are provided with comparatively smooth inner surfaces and advantageously are fabricated from a dielectric wear-resistant material such as tetrafluoroethylene, polyethylene terephthalate or other suitable synthetic polymer, or from a material such as fiber glass which has been impregnated with tetrafluoroethylene, for example. As best shown in FIGURE 2, the tapes 68 and 69 are supported a short distance above the reaches 36 and 37 of the conveyor belts 22 and 23 (only the tape 69, the reach 37 and the belt 23 being visible in FIGURE 2) in contact with the outer surfaces of the pieces 15 and 16 to be joined. The ends of the tape 68 are respectively affixed to a supply reel 70 (FIGURE 1) and a storage reel 71, while the ends of the tape 69 are similarly affixed to a supply reel 72 and a storage reel 73. The supply reels 70 and 72 are mounted on shafts 75, which extend transversely with respect to the feed path 20 and are journalled in a stationary plate 76. The storage reels 71 and 73 are connected to a speed reducing mechanism 77 on the plate 76 by means of shafts 78. The mechanism 77 is driven by a shaft 79 which rotates at constant speed to drive the storage reels 71 and 73. The arrangement is such that the tapes 68 and 69 are advanced along the feed path 20 in the same direction as the direction of movement of the pieces 15 and 16 but at a considerably slower speed.

A vibratory sealing tool indicated generally at 80 is disposed along the feed path 20 at a welding station immediately adjacent the dielectric tapes 68 and 69. The tool 80 preferably is of a type similar to that disclosed in the copending patent applications referred to above and includes a vibratory member in the form of a horn 81 which is positioned on one side of the feed path 20. The horn 81 has a natural mechanical resonant frequency which customarily is above the upper range of the audible spectrum and preferably lies between about 20,000 cycles per second and several hundred thousand cycles per second or even higher. A transducer 82 adjacent the enlarged lower surface of the horn 81 is supplied with alternating current from a controller 84 and an amplifier 87 which illustratively are of the type disclosed in the above-mentioned application Ser. No. 425,230. As will be understood, the transducer 82 induces ultrasonic vibrations of the compressional wave energy type at predetermined frequency in the horn 81. A portion of these vibrations is reflected by boundaries such as interfaces to produce standing wave patterns in the horn which include one or more zones or nodes of minimum motion at one-half wavelength intervals and other zones or antinodes of maximum motion at distances of one-quarter wavelength from an adjacent node. The longitudinal dimension of the horn is such that its smaller end terminates at an antinode to provide vibrations of maximum amplitude. This smaller end forms a jaw member 88 which engages the insulating tape 69 intermediate the reels 72 and 73.

The sealing tool 80 additionally includes a stationary jaw member or anvil 90 which is positioned on the side of the feed path 20 opposite that of the horn 81. The anvil 90 engages the insulating tape 68 at a point intermediate the reels 70 and 71 and is resiliently urged toward the horn 81 by a coil spring 92. The spring 92 enables the application of adjustable pressure to the tapes 68 and 69 and the pieces 15 and 16 of material therebetween.

Two plates 95 and 96 are disposed on opposite sides of the feed path 20 immediately downstream from the ultrasonic sealing tool 80. The plates 95 and 96 are located a short distance above the level of the jaw members 88 and 90 and the dielectric tapes 68 and 69 and are spaced apart by a distance which is equal to the combined thicknesses of the pieces 15 and 16 of material. Longitudinally extending along opposite sides of the path 20 are two additional plates 97 and 98. These latter plates are positioned slightly beneath the level of the jaws 88 and 90 between the plates 95 and 96 and the outfeed pulleys 26 and 31. The plates 97 and 98 are biased toward each other by coil springs 99 to urge the reaches 36 and 37 of the conveyor belts 22 and 23 together under pressure, thereby squeezing the pieces 15 and 16 therebetween in a manner similar to that of the infeed plates 58 and 59.

In operation, the lower conveyor belt 18 is driven at a constant speed to direct successive bags 17 along the feed path 20. The upper end of each bag enters the nip between the infeed pulleys 25 and 30, and the pieces 15 and 16 of material which form this end of the bag are squeezed together between the reaches 36 and 37 of the conveyor belts 22 and 23. The belts 22 and 23 continuously advance the pieces 15 and 16 along the path 20, and the coil springs 60 exert pressure on the presser plates 58 and 59 to squeeze the pieces between the reaches 36 and 37.

Shortly after the reaches 36 and 37 and the pieces 15 and 16 therebetween leave the presser plates 58 and 59, the pieces 15 and 16 are led between the two dielectric tapes 68 and 69. The speed reducing mechanism 77 is effective to rotate the reels 71 and 73 in opposite directions to continuously direct the tapes 68 and 69 along the feed path 20. The direction of movement of the tapes 68 and 69 is the same as that of the pieces 15 and 16, but the tapes are led along the path 20 at a considerably slower speed. As an illustration, in one preferred embodiment of the invention the pieces 15 and 16 proceed along the path 20 at a speed of about two hundred and forty inches per minute, while the tapes 68 and 69 are advanced at a speed of from about one eighth of an inch per minute to about one quarter of an inch per minute. The surfaces of the tapes in contact with the pieces 15 and 16 are comparatively smooth to provide a low coefficient of friction between the tapes and the pieces, with the result that the pieces slide easily between the tapes as they move along the path.

Figure 4:
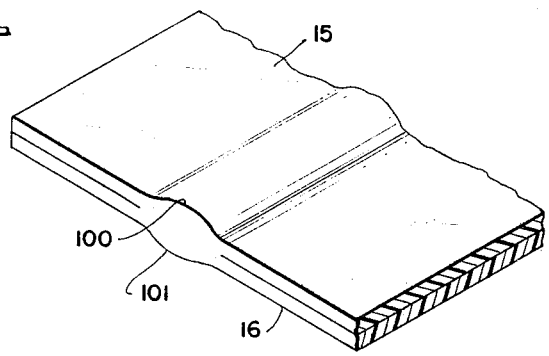
FIGURE 4 is a fragmentary perspective view of a bulge type seal fabricated through the use of the apparatus of FIGURES 1–3.

As the pieces 15 and 16 and the dielectric tapes 68 and 69 enter the gap between the jaw members 88 and 90 of the vibratory sealing tool 80, the jaw member 90 moves slightly against the resistance of the coil spring 92 and accommodates slight changes in the thickness of the material. Ultrasonic vibratory energy is applied by the transducer 82 to the horn 81 and is transmitted through the tapes 68 and 69 to the pieces 15 and 16. The energy transmitted to the pieces generates heat as a result of the pounding action of the horn 81 to cause plasticization and fusing of their facing surfaces and form a continuous bond or seal therebetween. To insure that the seal is of the bulge type, the generated heat also should radiate to the outer surfaces of the pieces to produce a softening effect. However, in the absence of the tapes 68 and 69 a substantial amount of heat would be carried away by the jaw members 88 and 90, with the result that insufficient softening would occur on the outer surfaces to form the desired bulge. The tapes 68 and 69 serve as insulators which prevent such heat loss to an appreciable extent, so that the outer surfaces become soft and form continuous bulges 100 and 101 (FIGURE 4) along the seal without the need for applying supplemental heat thereto.

Because of the movement of the dielectric tapes 68 and 69 along the feed path 20 between the jaw members 88 and 90, the tapes are continuously replenished to avoid any adverse effect on their insulating properties as a result of the pounding action of the jaws. In the embodiment of the invention illustrated in FIGURES 1-3, the movement of the tapes 68 and 69 is continuous and at a uniform rate, although in other embodiments the tapes may be advanced intermittently past the jaws 88 and 90. The tapes additionally serve to avoid any adhesion between the plastic outer surfaces of the pieces 15 and 16 and the jaws and to protect the jaws against abrasive wear.

Figure 8:
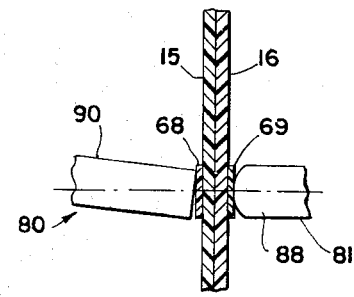
FIGURE 8 is a fragmentary sectional view taken along the line 8—8 in FIGURE 1.

As best shown in FIGURE 8, the jaw member 90 is tilted at a slight angle with respect to the jaw member 88. With this arrangement, a comparatively sharp edge of the member 90 is presented to the pieces 15 and 16 to provide maximum hammering energy. In addition, in the event of the inadvertent application of excess energy to the tool the incerased vibration causes the member 90 to yieldably cut into the adjacent tape 68, thereby providing a safety factor which reduces the possibility of damaging the tool.

As the sealed upper end of each of the bags 17 leaves the vibratory tool 80, the pieces 15 and 16 forming the end pass between the oppositely disposed plates 95 and 96. These plates engage the pieces immediately above the seal and serve to prevent the pieces from separating elastically while the seal is still hot. The pieces then move between the outfeed presser plates 97 and 98, where they are similarly held together immediately beneath the seal as it cools. After leaving the plates 97 and 98, the pieces pass between the rollers 26 and 31 and are discharged from the apparatus.

Figure 5:
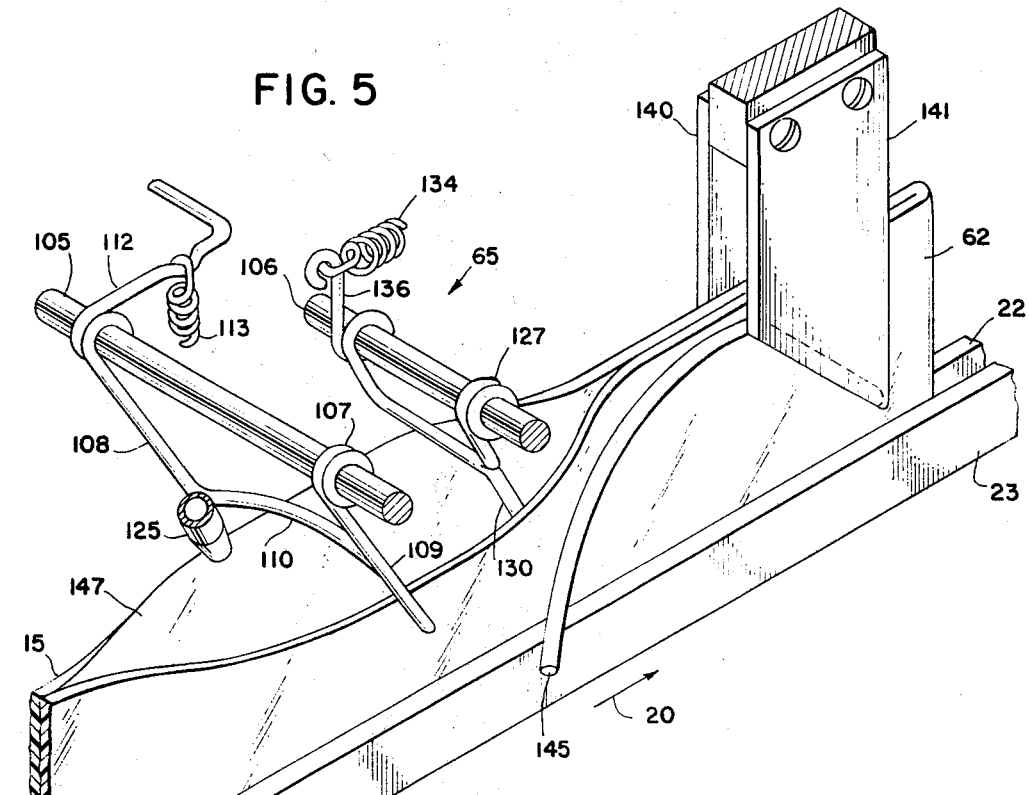
FIGURE 5 is an enlarged fragmentary perspective view of a portion of the apparatus of FIGURES 1–3, showing one way of applying wetting fluid and guiding the upper ends of the bags preparatory to the cleaning and sealing thereof.
Figure 6:
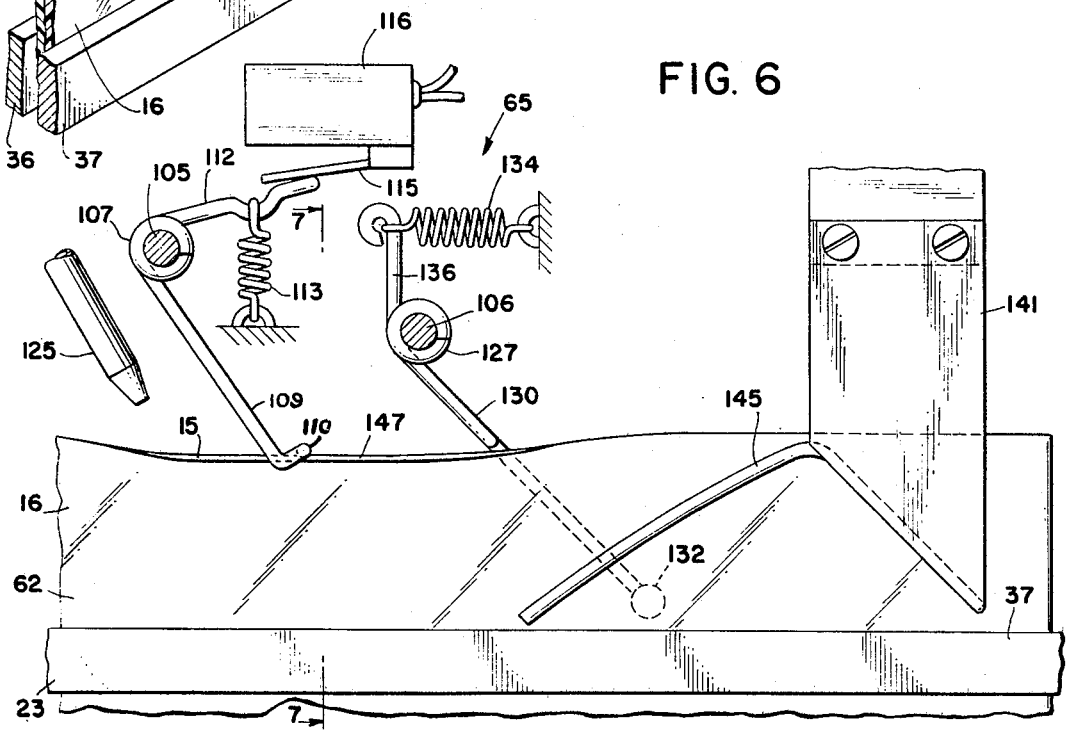
FIGURE 6 is an enlarged fragmentary elevational view, with certain parts shown in section, of the portion of the apparatus illustrated in FIGURE 5.
Figure 7:
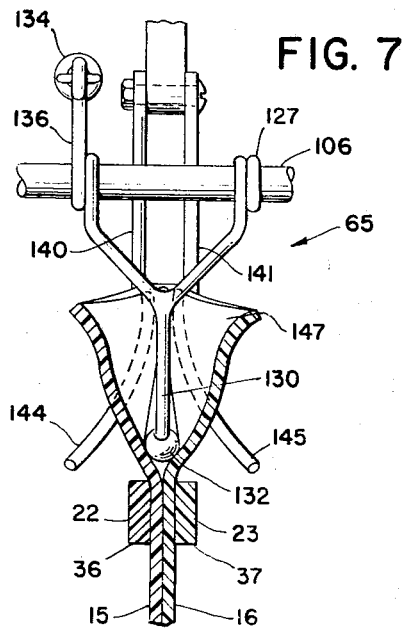
FIGURE 7 is a fragmentary sectional view taken along the line 7—7 in FIGURE 6.

Referring now to FIGURES 5-7 of the drawings, two stationary shafts 105 and 106 are disposed at the cleaning station 65. The shafts 105 and 106 extend transversely across the feed path 20 a short distance above the upper edges of the pieces 15 and 16 of material. A bell crank 107 is pivotally supported on the shaft 105 and includes two downwardly extending arms 108 and 109 which are integrally connected at their lower ends by a transverse lever arm or bar 110. The crank 107 additionally includes a generally horizontal arm 112. This latter arm is connected to a coil spring 113 which is effective to bias the crank in a clockwise direction, as viewed in FIGURE 6, to hold the bar 110 a short distance beneath the path of travel of the upper edges of the pieces 15 and 16. The outer end of the arm 112 is bent at an angle and is disposed in position to engage the trigger 115 of a normally open switch 116.

As shown schematically in FIGURE 2, the switch 116 is electrically connected in series with a solenoid 118. This solenoid includes an armature 119 which is connected to a valve 120. One end of a hose 121 communicates with the inlet side of the valve 120, while the other end leads to a fluid storage tank 123. The tank 123 contains a suitable cleaning fluid which illustratively comprises a wetting agent such as a mixture of water and alcohol or a solution of water and detergent, for example. A nozzle 125 extends downwardly from the outlet side of the valve 120 to a position immediately above the upper edges of the pieces 15 and 16.

Pivotally supported on the shaft 106 (FIGURES 5–7) is a fulcrum lever 127. The lever 127 includes a downwardly extending arm 130 which is bifurcated adjacent its upper portion to provide two pivotal connections to the shaft 106. A pocket-forming ball 132 is affixed to the lower end of the arm 130 and is disposed between the pieces 15 and 16 of material a short distance above the inner reaches 36 and 37 of the conveyor belts 22 and 23. The ball 132 is resiliently held in this position by a coil spring 134 which is connected to an upwardly directed arm 136 integral with the arm 130.

Two upstanding closure plates 140 and 141 are located on opposite sides of the feed path 20 on the downstream side of the fulcrum lever 127. The plates 140 and 141 are spaced apart by a distance substantially equal to the combined thicknesses of the pieces 15 and 16 of material and are oriented immediately above the conveyor belts 22 and 23 in position to urge the pieces 15 and 16 into contacting relationship with each other. The plates 140 and 141 respectively support two arcuately shaped guide wires 144 and 145 which extend toward the fulcrum lever 127 in contact with the outer surfaces of the pieces 15 and 16.

As the individual bags 17 (FIGURE 2) are directed along the feed path 20 and the pieces 15 and 16 reach the cleaning station 65, the forward portion of each bag contacts the transversely extending bar 110 on the bell crank 107. The bag slides under the bar 110, and the bar exerts a pressure against the upper edges of the pieces 15 and 16 which is sufficient to cause them to separate, thereby forming a gap or opening 147 therebetween. The engagement between the pieces 15 and 16 and the arm 110 rocks the bell crank 107 slightly in a counter-clockwise direction, as viewed in FIGURE 6, against the bias of the coil spring 113. The arm 112 of the crank 107 thereupon actuates the trigger 115 to close the switch 116. This switch energizes the solenoid 118 (FIGURE 2) to open the valve 120 and thereby enable the flow of a measured quantity of wetting fluid from the tank 123 through the hose 121 and the nozzle 125 into the gap 147 between the pieces 15 and 16. The quantity of fluid introduced into the gap 147 illustratively comprises one drop of fluid for each inch of material measured in the direction of the feed path. Because of the pressure exerted against the pieces 15 and 16 by the conveyor belts 22 and 23, the inserted fluid remains above the belts in the vicinity of the prospective seal.

The gap 147 is held open as the bag 17 continues its movement along the feed path 20. At the time the pieces 15 and 16 reach the fulcrum lever 127, the ball 132 at the lower end of the lever arm 130 forms a longitudinally extending pocket between the pieces 15 and 16, and the guide wires 144 and 145 engage the outer surfaces of the pieces to gradually reposition them in their superimposed contacting relationship. The wetting fluid is retained in the thus-formed pocket as the pieces continue their movement along path 20 between the plates 140 and 141.

Upon the arrival of the pieces 15 and 16 at the welding station, vibratory energy is applied by the sealing tool 80 in the vicinity of the pocket of wetting fluid. The oscillations of the tool 80 are effective to ultrasonically clean the inner facing surfaces of the pieces 15 and 16 and to form a bulge type seal between the pieces in the manner described heretofore.

The cleaning action of the tool 80 is of particular utility in cases in which the bags 17 are filled with powdered or granulated products. The ambient dust incident to the use of such products would otherwise exhibit a tendency to contaminate the sealing area and produce a seal of reduced strength. By applying the cleaning fluid to the facing surfaces of the material and forming the seal immediately thereafter, however, the adverse effects of dust or other contamination on the surfaces are eliminated, and the resulting seal exhibits extremely high strength and is substantially impervious to gas and moisture.

Figure 9:
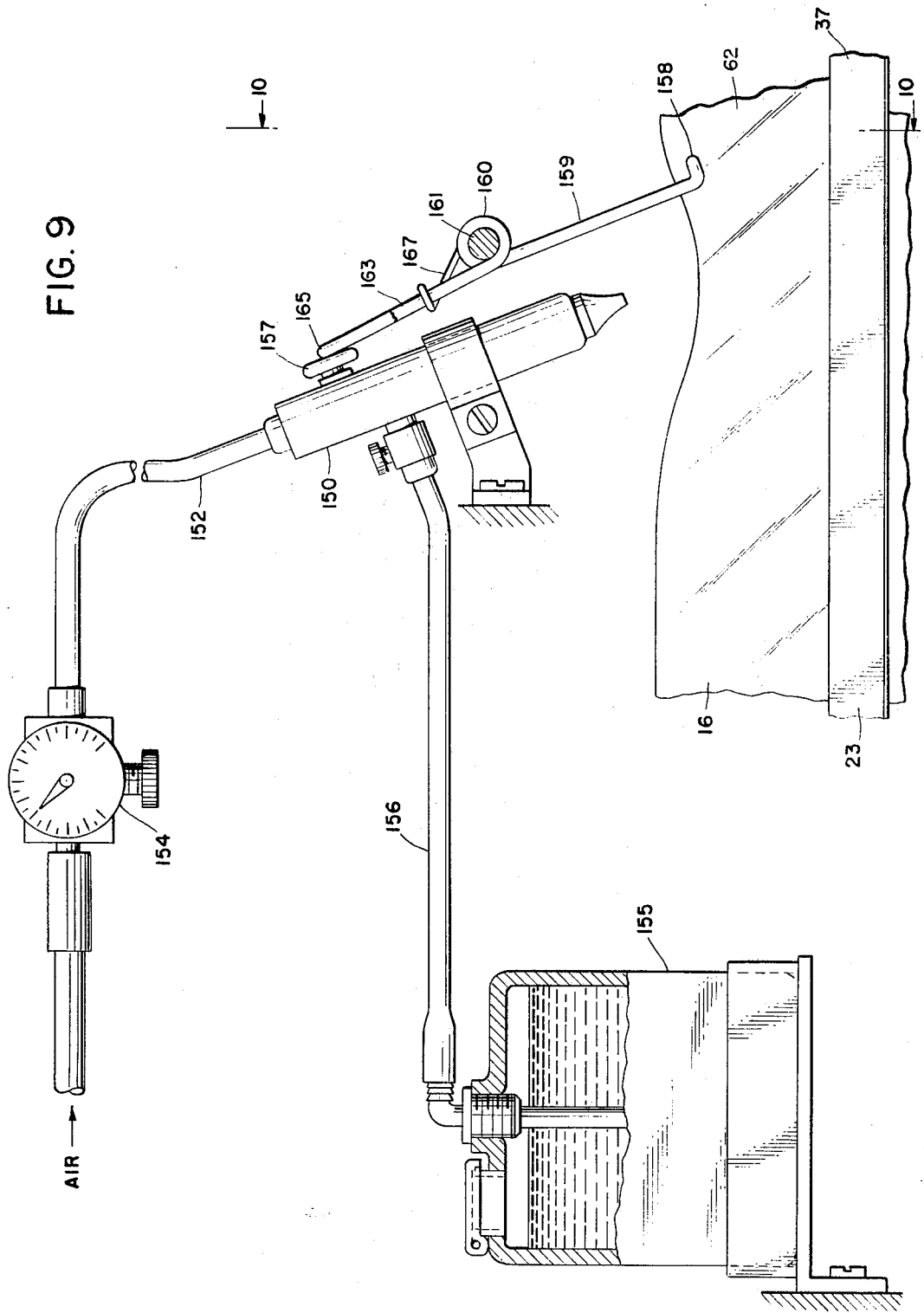
FIGURE 9 is a partly schematic side elevational view, with certain parts shown broken away and in section, which is generally similar to FIGURE 6 but illustrates another way of applying wetting fluid and guiding the upper end of the bag preparatory to the cleaning and sealing thereof.

In certain advantageous embodiments of the invention, the cleaning fluid is applied to the facing surfaces of the pieces 15 and 16 through the use of a jet of air or other gaseous fluid. In the embodiment shown in FIGURES 9 and 10, for example, there is provided an atomizing nozzle 150 which is connected to a source of air under pressure through a hose 152 and an adjustable pressure gauge 154. The nozzle 150 also is connected to a cleaning fluid reservoir 155 through a hose 156. The nozzle includes a pushbutton valve 157 which is controlled by the bight 165 of an upwardly extending U-shaped arm 163 on a fulcrum lever 160. The lever 160 is pivotally carried by a transversely extending shaft 161 which is supported above the feed path 20 in a position similar to that of the transverse shaft 105 (FIGURE 5). The lever 160 is provided with a second U-shaped arm 159 which extends in a downward direction from the shaft 161 with its bight 158 in position to engage the upper edges of the pieces 15 and 16 and thereby separate the pieces in the manner described above with respect to the lever arm or bar 110. A spring 167 is connected at one end to the shaft 161, and its other end engages the arm 163 to bias the lever 160 in a clockwise direction, as viewed in FIGURE 9.

Upon engagement of the bight 158 with the forward edge of each of the bags 17, the fulcrum lever 160 pivots slightly against the spring 167 to actuate the air valve 157. Air under pressure is thereupon admitted to the nozzle 150 through the hose 152 and is directed against the inner surfaces of the separated pieces 15 and 16 to remove particles of powder or dust therefrom. The air moving through the nozzle 150 produces a region of reduced pressure which sucks wetting fluid to the nozzle from the reservoir 155 and the hose 156. The fluid is discharged from the nozzle on to the inner surfaces of the pieces 15 and 16 in the form of a finely atomized spray. Upon the application of fluid to these surfaces, the pieces are repositioned in contacting relationship with each other and are ultrasonically cleaned and sealed in the manner described heretofore.

Figure 10:
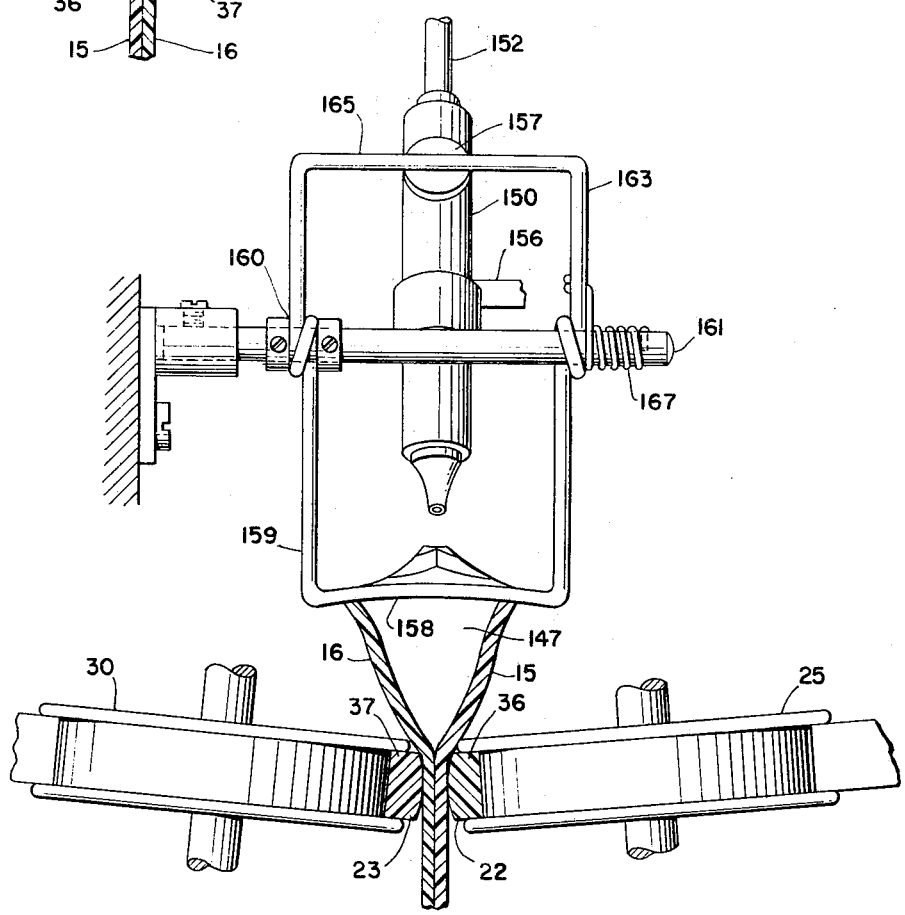
FIGURE 10 is a fragmentary sectional view taken along the line 10—10 in FIGURE 9.

In the embodiment of FIGURE 10, the axes of the infeed pulleys 25 and 30 for the conveyor belts 22 and 23 are arranged at a slight angle relative to each other. The outfeed pulleys 26 and 31 (not shown on FIGURE 10) are similarly oriented. With this arrangement, the reaches 36 and 37 of the belts exert increased pressure along their upper edges against the pieces 15 and 16. The pieces are tightly pressed together at the time the cleaning fluid is is inserted therebetween to further reduce the possibility of the finely atomized fluid flowing beneath the conveyor belts and into the bag.

Figure 11:
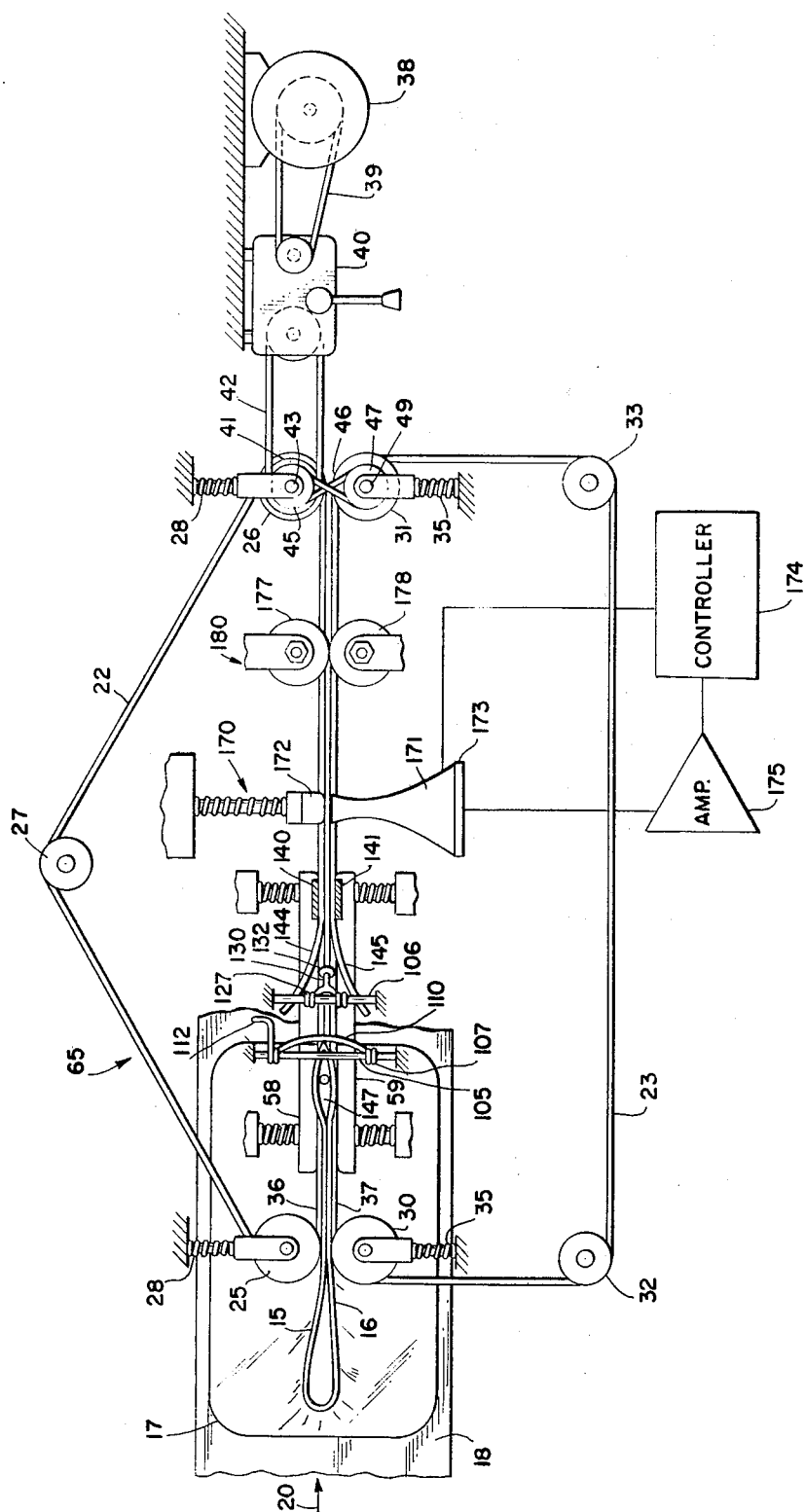
FIGURE 11 is a partly schematic top elevational view of apparatus for ultrasonically cleaning and bonding together the open upper ends of filled polymeric bags in accordance with another illustrative embodiment of the invention.

In the embodiments of the invention described heretofore, upon the application of the wetting fluid to the facing surfaces of the pieces 15 and 16 the pieces are simultaneously cleaned and sealed in a single-stage operation. In other good embodiments, the pieces are cleaned and then sealed in two successive stages. As an illustration, in FIGURE 11 there is shown an apparatus for sealing the successive bags 17 in which the pieces 15 and 16 are first cleaned through the use of ultrasonic techniques and are thereafter subjected to heat to form the seal. The apparatus includes an ultrasonic cleaning tool 170 which comprises a horn 171 and an anvil 172 disposed on opposite sides of the feed path 20 immediately downstream of the cleaning station 65. The tool 170 is similar in appearance to the ultrasonic sealing tool 80 (FIGURE 1) described above and is provided with a transducer 173 which is supplied with vibratory energy from a controller 174 and an amplifier 175. Contrary to the controller 84 and the amplifier 87 for the sealing tool 80, however, the controller 174 and the amplifier 175 are effective to apply considerably less power to the cleaning tool 170 than would be required for an ultrasonic sealing operation. Thus, in one illustrative embodiment approximately ten watts of power are applied to the tool 170, whereas upwards of eighty watts might be needed in a corresponding embodiment in cases in which the tool was designed to also form an ultrasonic seal. The tool 170 cooperates with the wetting fluid applied at the station 65 to remove any contamination that might be present on the facing surfaces of the pieces 15 and 16.

Positioned along the feed path 20 between the ultrasonic cleaning tool 170 and the outfeed pulleys 26 and 31 are two roller electrodes 177 and 178. The electrodes 177 and 178 are located on opposite sides of the pieces 15 and 16 at a welding station indicated generally at 180. These electrodes are supplied with alternating current at a frequency which is considerably above the ultrasonic frequency range and are arranged to generate sufficient heat to form a continuous bond or seal between the pieces 15 and 16. The cleaned and sealed pieces are then carried by the conveyor belts 22 and 23 directly to the outfeed end of the apparatus, no outfeed pressure plates being employed.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention.

What is claimed is:

1. In a method for joining pieces of thermoplastic material, the steps of advancing the pieces of material to be joined along a feed path in superimposed facing relationship with each other, locating said pieces between a pair of movable dielectric members, directing said dielectric members along said path at a rate which is less than the rate of movement of the pieces of material therebetween, leading said dielectric members with said pieces therebetween to a vibratory sealing tool disposed along said path, and vibrating said tool at a predetermined frequency, to transmit vibratory energy through said dielectric members to said pieces and thereby form a bond therebetween.

2. In a method for joining pieces of thermoplastic sheet material, the steps of continuously advancing the pieces of thermoplastic sheet material to be joined along a feed path in superimposed facing relationship with each other, locating said pieces between a pair of movable dielectric members having comparatively smooth inner surfaces in contact with said pieces, directing said dielectric members along said path at a rate which is less than the rate of movement of the pieces of material therebetween, leading said dielectric members with said pieces therebetween to a vibratory sealing tool disposed along said path, and vibrating said tool at a predetermined ultrasonic frequency, to transmit vibratory energy through said dielectric members to said pieces and thereby form a bulge-type seal therebetween.

3. In a method of the character set forth in claim 2, said dielectric members being continuously directed along said feed path at a uniform rate which is substantially less than the rate of movement of the pieces of material.

4. A method for joining pieces of thermoplastic material comprising the steps of continuously advancing the pieces of material to be joined along a feed path in superimposed facing relationship with each other, applying a wetting fluid to the facing surfaces of said pieces during their movement along said path, locating said pieces between a pair of movable dielectric members, directing said dielectric members along said path at a rate which is less than the rate of movement of the pieces of material therebetween, leading said dielectric members with said pieces therebetween to a vibratory sealing tool disposed along said path, and vibrating said tool at a predetermined frequency, to transmit vibratory energy through said dielectric members to said pieces and thereby simultaneously clean said facing surfaces and form a continuous seal between said pieces.

5. A method for joining pieces of thermoplastic sheet material comprising the steps of advancing the pieces of thermoplastic sheet material to be joined along a feed path in superimposed facing relationship with each other, applying a wetting fluid to the facing surfaces of said pieces, locating said pieces between a pair of dielectric members, leading said dielectric members with said pieces therebetween to an ultrasonic vibratory tool, vibrating said tool at a predetermined frequency, to transmit vibratory energy through said dielectric members to said pieces and thereby clean the facing surfaces thereof, and sealing said pieces to provide a continuous weld therebetween.

6. A method for joining pieces of thermoplastic sheet material comprising the steps of continuously advancing the pieces of thermoplastic sheet material to be joined along a feed path in superimposed facing relationship with each other, separating said pieces during their movement along said path, applying a wetting fluid to the separated facing surfaces of said pieces and thereafter repositioning said pieces in said superimposed relationship as the pieces continue their movement along said path, leading said pieces to an ultrasonic vibratory tool, vibrating said tool at a predetermined frequency, to transmit vibratory energy to said pieces and thereby clean the facing surfaces thereof, and sealing said pieces to provide a continuous weld therebetween.

7. A method of the character set forth in claim 6, in which said pieces of material are sealed by said ultrasonic vibratory tool.

8. A method of the character set forth in claim 6, in which said ultrasonic vibratory tool is effective to clean said pieces of material at a first point along said feed path, and in which the cleaned pieces of material are sealed at a subsequent point along said path.

9. A method for joining pieces of material comprising the steps of advancing the pieces of material to be joined along a feed path in superimposed facing relationship with each other, separating said pieces during their movement along said path, applying a wetting fluid to the separated facing surfaces of said pieces, forming a pocket for said wetting fluid between said pieces and thereafter repositioning said pieces in said superimposed relationship with the wetting fluid disposed on said pocket, leading said pieces to an ultrasonic vibratory tool having a pair of opposed jaw members, the pocket in said pieces being led between said jaw members, vibrating said tool at a predetermined frequency, to transmit vibratory energy to said pieces and thereby clean the facing surfaces thereof, and sealing said pieces to provide a continuous weld therebetween.

10. A method for joining pieces of thermoplastic sheet material comprising the steps of continuously advancing the pieces of thermoplastic sheet material to be joined along a feed path in superimposed facing relationship with each other, separating said pieces during their movement along said path, atomizing a wetting fluid and applying the atomized fluid to the separated facing surfaces of said pieces, thereafter repositioning said pieces in said superimposed relationship with said wetting fluid disposed therebetween, leading said pieces to a vibratory sealing tool, and vibrating said tool at a predetermined frequency, to transmit vibratory energy to said pieces, said vibratory energy cleaning the facing surfaces of said pieces and forming a continuous bond therebetween.

11. A method for joining pieces of thermoplastic sheet material comprising the steps of continuously advancing the pieces of thermoplastic sheet material to be joined along a feed path in superimposed facing relationship with each other, separating said pieces during their movement along said path, applying a wetting fluid to the separated facing surfaces of said pieces and thereafter repositioning said pieces in said superimposed relationship as the pieces continue their movement along said path, locating said pieces between a pair of movable dielectric members, directing said dielectric members along said path at a rate which is less than the rate of movement of the pieces of material therebetween, leading said dielectric members with said pieces therebetween to a vibratory sealing tool, and vibrating said tool at a predetermined ultrasonic frequency to transmit vibratory energy through said dielectric members to said pieces, said vibratory energy cleaning the facing surfaces of said pieces and forming a bulge-type seal therebetween.

12. A method for joining pieces of thermoplastic sheet material comprising the steps of continuously advancing the pieces of thermoplastic sheet material to be joined along a feed path in superimposed facing relationship with each other, separating said pieces during their movement along said path, applying a wetting fluid to the separated facing surfaces of said pieces, forming a pocket for said wetting fluid between said pieces and thereafter repositioning said pieces in said superimposed relationship as the pieces continue their movement along said path with the wetting fluid disposed in said pocket, locating said pieces between a pair of movable dielectric tapes of synthetic material, continuously directing said dielectric tapes along said path at a rate which is less than the rate of movement of the pieces of material therebetween, leading said dielectric tapes with said pieces therebetween to a vibratory sealing tool having a pair of opposed jaw members, the pocket in said pieces being led between said jaw members, and vibrating said tool at a predetermined ultrasonic frequency to transmit vibratory energy through said dielectric tapes to said pieces, said vibratory energy cleaning the facing surfaces of said pieces and forming a bulge-type seal therebetween.

13. An apparatus for joining pieces of thermoplastic material, in combination, conveyor means for advancing the pieces of material to be joined along a feed path in superimposed facing relationship with each other, means including a pair of dielectric members movable along said path in contact with said pieces, drive means for advancing said dielectric members along said path at a rate which is less than the rate of movement of said pieces, a vibratory sealing tool having a pair of opposed jaws disposed along said path, said conveyor means and said drive means respectively advancing said pieces and said dielectric members between said jaws, and means for imparting vibratory oscillations to said sealing tool, said oscillations being transmitted through said dielectric members to said pieces to form a bond therebetween.

14. Apparatus of the character set forth in claim 13, in which each of said dielectric members comprises a tape of synthetic wear-resistant material having a comparatively smooth surface in contact with the adjacent piece of material.

15. Apparatus of the character set forth in claim 13, in which one of said jaws includes a comparatively sharp edge and is tilted at a slight angle with respect to the other jaw to present said edge to the pieces between the jaws.

16. Apparatus for joining pieces of thermoplastic sheet material, comprising, in combination, conveyor means for continuously advancing the pieces of thermoplastic sheet material to be joined along a feed path in superimposed facing relationship with each other, means disposed along said path for applying cleaning fluid to the inner facing surfaces of said pieces of material, means including a pair of dielectric members movable along said path in respective contact with the outer surfaces of said pieces, a vibratory sealing tool having a pair of opposed jaws disposed along said path in position to receive said dielectric members and said pieces therebetween, and means for imparting vibratory oscillations to said sealing tool, said oscillations being transmitted through said dielectric members to said pieces to simultaneously clean said facing surfaces and form a bulge-type seal between said pieces.

17. Apparatus for joining pieces of thermoplastic material comprising, in combination, conveyor means for advancing the pieces of material to be joined along a feed path in superimposed facing relationship with each other, means disposed at a first station along said path for separating said pieces of material, a supply of wetting fluid, dispensing means connected to said supply and positioned immediately adjacent said first station for applying said wetting fluid to the separated facing surfaces of said pieces, means located along said path for repositioning said pieces in said superimposed facing relationship with said wetting fluid therebetween, an ultrasonic vibratory tool disposed at a second station along said path in position to receive said pieces, means for imparting vibratory oscillations to said tool, said oscillations being transmitted to said pieces to clean the facing surfaces thereof, and means positioned along said path for welding said pieces to provide a seal therebetween.

18. Apparatus for joining pieces of thermoplastic sheet material comprising, in combination, conveyor means for continuously advancing the pieces of thermoplastic sheet material to be joined along a feed path in superimposed facing relationship with each other, said conveyor means exerting pressure against said pieces of material during their movement along said path, means disposed at a first station along said path for separating said pieces of material, a supply of wetting fluid, dispensing means connected to said supply and positioned immediately adjacent said first station for applying said wetting fluid to the separated facing surfaces of said pieces, means located along said path adjacent said dispensing means for forming a pocket between said pieces and for repositioning said pieces in said superimposed relationship with the wetting fluid disposed in said pocket, an ultrasonic vibratory tool having a pair of opposed jaws disposed at a second station along said path in position to receive said pieces, means for imparting vibratory oscillations to said tool, said oscillations being transmitted to said pieces to clean the facing surfaces thereof, and means positioned along said path for sealing said pieces to provide a continuous bond therebetween.

19. Apparatus for joining pieces of thermoplastic sheet material comprising, in combination, conveyor means for continuously advancing the pieces of thermoplastic sheet material to be joined along a feed path in superimposed facing relationship with each other, means disposed at a first station along said path for separating said pieces of material, a supply of wetting fluid, dispensing means connected to said supply and positioned immediately adjacent said first station for applying said wetting fluid to the separated facing surfaces of said pieces, guide means located along said path for repositioning said pieces in said superimposed relationship with said wetting fluid therebetween, means including a pair of dielectric members movable along said path in respective contact with the outer surfaces of the repositioned pieces, drive means for advancing said dielectric members past a second station along said path at a rate which is less than the rate of movement of said pieces, an ultrasonic vibratory tool having a pair of opposed jaws disposed at said second station, said conveyor means and said drive means respectively advancing said pieces and said dielectric members between said jaws with the dielectric members in respective contact therewith, and means for imparting vibratory oscillations to said tool, said oscillations being transmitted through said dielectric members to said pieces to clean the facing surfaces thereof and form a continuous bond therebetween.

20. Apparatus for joining pieces of thermoplastic sheet material comprising, in combination, conveyor means for continuously advancing the pieces of thermoplastic sheet material to be joined along a feed path in superimposed facing relationship with each other, means disposed at a first station along said path for separating said pieces of material, a supply of wetting fluid, dispensing means connected to said supply and positioned immediately adjacent said first station for applying successive drops of said wetting fluid to the separated facing surfaces of said pieces, means located along said path adjacent said dispensing means for forming a pocket between said pieces and for repositioning said pieces in said superimposed relationship with the wetting fluid disposed in said pocket, means including a pair of dielectric tapes of synthetic wear-resistant material movable along said path in respective contact with the outer surfaces of the repositioned pieces, drive means including supply reels and take-up reels adjacent said path for continuously advancing said dielectric tapes past a second station along said path at a rate which is less than the rate of movement of said pieces, an ultrasonic vibratory tool having a pair of opposed jaws disposed at said second station, said conveyor means and said drive means respectively advancing said pieces and said dielectric tapes between said jaws with the tapes in respective contact therewith, and means for imparting vibratory oscillations to said tool, said oscillations being transmitted through said tapes to said pieces to clean the facing surfaces thereof and form a continuous bond therebetween.

References Cited

UNITED STATES PATENTS

| | | | |
|---|---|---|---|
| 3,294,616 | 12/1966 | Linsley et al. | 156—73 XR |
| 2,665,735 | 1/1954 | Steffenino | 156—380 XR |
| 3,242,029 | 3/1966 | Deans | 156—73 XR |
| 3,286,433 | 11/1966 | Johnson et al. | 53—167 XR |

PHILIP DIER, Primary Examiner

U.S. Cl. X.R.

29—470.3; 53—167, 373; 156—274, 308, 380, 580; 228—1